J. IRWIN.
Harvester Cutter.
No. 17,739.
Patented July 7, 1857.
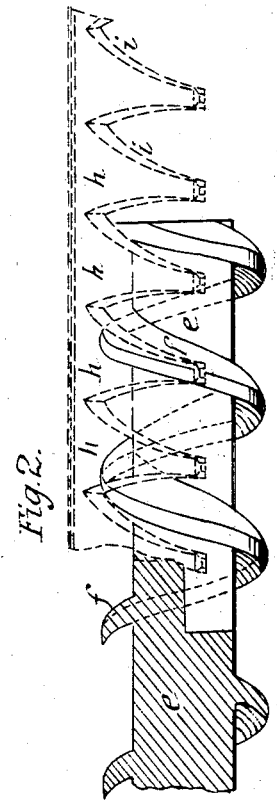
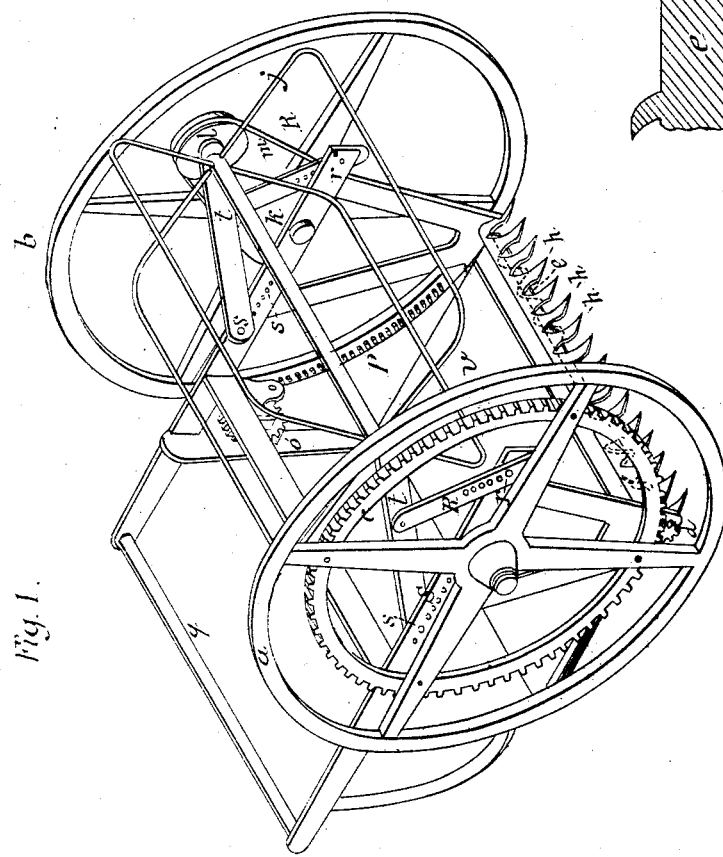

UNITED STATES PATENT OFFICE.

JOSEPH IRWIN, OF FRANKFORT, OHIO.

IMPROVED CUTTING APPARATUS FOR HARVESTERS.

Specification forming part of Letters Patent No. 17,739, dated July 7, 1857.

*To all whom it may concern:*

Be it known that I, JOSEPH IRWIN, of Frankfort, Ross county, Ohio, have invented a new and useful Improvement in Grain and Grass Harvesters; and I hereby declare the following to be a full and exact description thereof, reference being had to the accompanying drawings, making part of this specification.

My invention relates chiefly to a novel arrangement of a cutting apparatus in which the cutter has a continuous uniform motion always in one direction, thus overcoming the loss of power and other disadvantages inseparable from rapid reciprocating motions.

In the accompanying drawings, Figure 1 represents a perspective view of the machine; and Fig. 2, a front elevation of a portion of the cutting apparatus, partly in section.

$a$ $b$ are two drive-wheels of large size, the former of which gives motion to the cutting apparatus by means of a large cog-wheel, $c$, attached to its inner face, gearing with a pinion, $d$, on the end of the cutter-shaft $e$.

$e f$ is the cutter, consisting of a spiral blade, $f$, attached around a horizontal shaft, $e$. The blade $f$ is made to project on the cutting side, either by being formed concave on that side, as represented in Fig. 2, or by the attachment of a thin plate of steel around the periphery of the thread, with its edge projecting. The fingers $h$ $h$ $h$ are made to correspond with the form of the cutter, extending around the latter in front to a short distance below its center, at which point they project forward in a horizontal direction, terminating in points. At that part of the fingers which surrounds the cutter they are provided on one side with a cutting-edge, $i$, against which the edge of the rotary cutter cuts shearwise.

The "pitch" of the spiral may be varied as experience may prove advisable, and the cutting-edge of the fingers adapted to it at any relative angle which may be deemed best; but whether so arranged that the shearing action shall be from the point of the finger backward, or vice versa, I prefer the edges to be nearly parallel.

In the form and relative proportions here represented about two-thirds only of the continuous thread of the cutter comes in contact with the cutting-edges of the fingers, the remainder having no resistance to cut against, excepting that afforded by the standing grain itself. This part of the thread may, if preferred, be entirely omitted.

The edges of the cutter and fingers may be sickled or smooth, as preferred.

The second drive-wheel, $b$, imparts motion to the reel $j$ by means of pulleys $k$ $l$ and band $m$, and also to the raking or gaveling apparatus, which consists of an endless apron, $n$, passing around a roller at each end. One of these rollers is connected with the pinion $o$ by means of a band and pulley, which pinion, gearing into a series of cogs, $p$, which occupy a portion of the inner face of the wheel $b$, near its periphery, receives at every rotation of said wheel an intermittent motion, which, being communicated to the apron $n$, causes the latter once during every revolution of the wheel to deposit on the ground such grain as may be on it. Two or more of these series of cogs may be used should it be deemed advisable to rake off twice or oftener for each revolution.

The reel $j$ is made adjustable perpendicularly and laterally by means of the series of holes R S, which are adapted to receive respectively the bolts $r$ $s$, the joint $t$ being hinged.

In use the machine is provided with a divider to separate the grain in front of the drive-wheel, which, being a device well known and in common use, is not here represented.

The simplicity of arrangement in this machine and the avoidance of friction, and of all the checking of momentum incident to reciprocating knives, permit the cutter to be driven freely at a very high speed.

The machine as here shown is intended to be propelled by hand by means of the bar $q$; but it may be adapted to one or more horses by the employment of shafts or tongue in any customary form.

I am aware that spiral cutters have been used before. I am also aware that a continuous spiral bar has been used in combination with stationary cutters, as in the patent of A.

Armsden; and I do not wish to be understood as claiming such devices; but

What I do claim as my invention, and desire to secure by Letters Patent, is—

The spiral cutter $e\ f$, when the same is arranged below and used in combination with the curved cutting-fingers $h\ h$, in the manner and for the purpose set forth.

In testimony of which invention I hereunto set my hand.

JOS. IRWIN.

Attest:
 OCT. KNIGHT,
 I. M. TAYLOR.